(12) United States Patent
Yoon et al.

(10) Patent No.: US 9,164,289 B2
(45) Date of Patent: Oct. 20, 2015

(54) STEREOSCOPIC IMAGE DISPLAY DEVICE

(71) Applicant: LG Display Co., Ltd., Seoul (KR)

(72) Inventors: A Ra Yoon, Seoul (KR); Sung Woo Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 72 days.

(21) Appl. No.: 14/095,001

(22) Filed: Dec. 3, 2013

(65) Prior Publication Data
US 2014/0152924 A1    Jun. 5, 2014

(30) Foreign Application Priority Data

Dec. 4, 2012 (KR) .......................... 10-2012-0139912
Dec. 4, 2012 (KR) .......................... 10-2012-0139914

(51) Int. Cl.
*G02F 1/1335*  (2006.01)
*G02F 1/1337*  (2006.01)
*G02B 27/26*  (2006.01)
*G02B 27/22*  (2006.01)
*G02F 1/1347*  (2006.01)
*G02F 1/1334*  (2006.01)

(52) U.S. Cl.
CPC ............ *G02B 27/26* (2013.01); *G02B 27/2214* (2013.01); *G02F 1/13471* (2013.01); *G02F 1/133526* (2013.01); *G02F 1/1334* (2013.01); *G02F 2203/07* (2013.01); *G02F 2203/62* (2013.01)

(58) Field of Classification Search
CPC ................... G02F 1/133526; G02F 1/133621; G02F 1/133512; G02F 1/133528; G02F 1/133536; G02F 1/1393; G02F 1/133707; G02F 2001/133742; G02B 27/26; G02B 27/2214; G02B 5/3033; H04N 13/0404; H04N 13/0403; H04N 13/0409
USPC ........................................ 349/15, 95, 96, 130
See application file for complete search history.

(56) References Cited

U.S. PATENT DOCUMENTS

2010/0026920 A1 *  2/2010  Kim et al. ........................ 349/15

* cited by examiner

*Primary Examiner* — Mike Qi
(74) *Attorney, Agent, or Firm* — Brinks Gilson and Lione

(57) ABSTRACT

A stereoscopic image display device that enables 2D/3D image output conversion includes a display panel configured to display an image and a polarization lens panel disposed on the display panel and configured to transmit as-is or refract light supplied from the display panel according to an image display mode. The polarization lens panel includes: first and second substrates; a lower electrode formed on the first substrate; an upper electrode formed on the second substrate; and a polymer liquid crystal layer formed of a polymer liquid crystal in which a polymer and a liquid crystal are combined, and disposed between the lower electrode and the upper electrode.

13 Claims, 6 Drawing Sheets

STEREOSCOPIC IMAGE DISPLAY DEVICE

CROSS-REFERENCE TO RELATED APPLICATIONS

This application claims the benefit of priority to Korean Patent Applications No. 10-2012-0139914 and No. 10-2012-0139912 filed on Dec. 4, 2012, which is hereby incorporated by reference as if fully set forth herein.

BACKGROUND

1. Field of the Disclosure

The present disclosure relates to a stereoscopic image display device, and more particularly, to a stereoscopic image display device that enables a viewer to view a stereoscopic image without glasses.

2. Discussion of the Related Art

Stereoscopic (three-dimensional (3D)) image display devices are devices that provide different images to a left eye and a right eye of a viewer, and thus enable the viewer to view a stereoscopic image due to a binocular parallax between the left eye and the right left.

Recently, research is being actively done for a glasses-free technique in which a user does wear stereoscopic glasses. Examples of the glasses-free technique include a lenticular technique, which separates a left image and a right image by using a cylindrical lens array, and a barrier technique that separates the left image and the right image by using a barrier.

In a stereoscopic image display device using the barrier technique, a plurality of barriers in which a plurality of openings having a slit shape are arranged in parallel are arranged at certain intervals in a display panel, and a left image and a right image are separated by the barriers and are respectively input to a left eye and a right eye of a viewer. The stereoscopic image display device using the barrier technique is easily manufactured, but since light is blocked by the barriers, brightness of a screen is severely reduced.

In a stereoscopic image display device using the lenticular technique, a transparent lenticular lens having a semicylindric shape is disposed in a display panel, and a left image and a right image are separated by the lenticular lens and are respectively input to a left eye and a right eye of a viewer.

In the stereoscopic image display device using the lenticular technique, brightness of a screen is not reduced unlike the barrier technique, but it is impossible to perform two-dimensional (2D)/3D image output conversion.

SUMMARY

A stereoscopic image display device includes: a display panel configured to display an image; and a polarization lens panel disposed on the display panel, and configured to transmit as-is or refract light supplied from the display panel according to an image display mode, wherein the polarization lens panel includes: first and second substrates; a lower electrode formed on the first substrate; an upper electrode formed on the second substrate; and a polymer liquid crystal layer formed of a polymer liquid crystal in which a polymer and a liquid crystal are combined, and disposed between the lower electrode and the upper electrode.

In another aspect, a stereoscopic image display device includes: a display panel configured to display an image; a polarization lens panel disposed on the display panel, and configured to transmit as-is or refract light supplied from the display panel according to an image display mode; and a polarization lens control panel disposed between the display panel and the polarization lens panel, and configured to control a polarization state of the light incident from the display panel, wherein the polarization lens control panel includes: first and second substrates; a lower electrode formed on the first substrate; an upper electrode formed on the second substrate; and a polymer liquid crystal layer formed of a polymer liquid crystal in which a polymer and a liquid crystal are combined, and disposed between the lower electrode and the upper electrode.

In another aspect, a stereoscopic image display device includes: a display panel configured to display an image; and a polarization lens integration panel disposed on the display panel, and configured to transmit as-is or refract light incident from the display panel according to an image display mode, wherein the polarization lens integration panel includes: first to third substrates; a lower electrode formed on the first substrate; an upper electrode formed on the second substrate; a polymer liquid crystal layer formed of a polymer liquid crystal in which a polymer and a liquid crystal are combined, and disposed between the lower electrode and the upper electrode; and a liquid crystal layer formed of a material having an optical anisotropy, and disposed between the second and third substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

In description of embodiments of the present invention, when a structure is described as being formed at an upper portion/lower portion of another structure or on/under the other structure, this description should be construed as including a case where the structures contact each other and moreover a case where a third structure is disposed therebetween. However, when the term "just on" or "just under" is used, it should be restrictively construed that structures contact each other.

Figure 1:
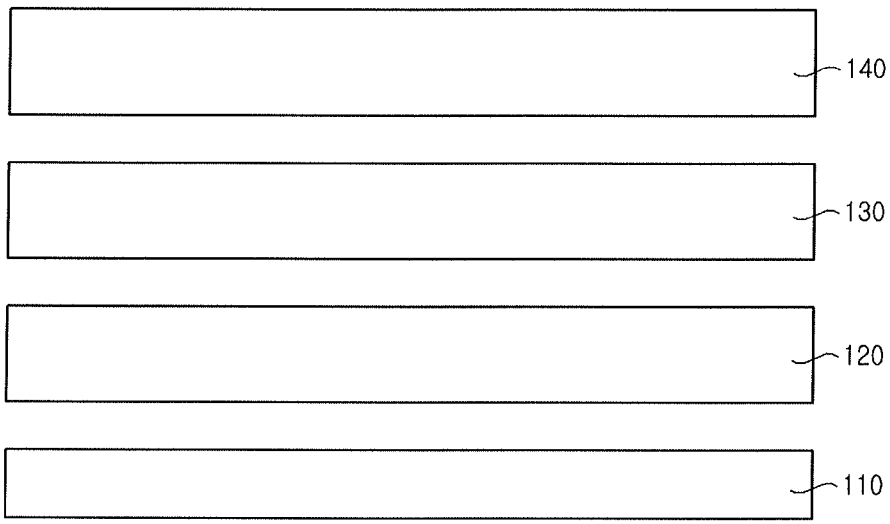
FIG. 1 is a diagram schematically illustrating a stereoscopic image display device according to an embodiment of the present invention.

FIG. 1 is a diagram schematically illustrating a stereoscopic image display device 100 according to an embodiment of the present invention.

Referring to FIG. 1, the stereoscopic image display device 100 according to an embodiment of the present invention includes a display panel 120, a backlight unit 110 that is disposed under the display panel 120 to supply light to the display panel 120, a polarization lens control panel 130, and a first polarization lens panel 140. Here, if the display panel 120 is an element that self-emits light, the backlight unit 110 may not be provided.

First, the display panel 120 may switch between a plane (2D) image display mode and a stereoscopic (3D) image display mode. The display panel 120 may display a plane image according to the plane image display mode, or may alternately display a left image and a right image on one screen according to the stereoscopic image display mode.

The display panel 120 may be applied to flat panel display devices such as liquid crystal display (LCD) devices, plasma display panels (PDPs), field emission display (FED) devices, light emitting diode (LED) display devices, etc.

When the display panel 120 is applied to an LCD device, the display panel 120 may be applied regardless of a liquid crystal mode, namely, a twisted nematic (TN) mode, an in-plane switching (IPS) mode, and a vertical alignment (VA) mode.

When the display panel 120 is a panel applied to an LCD device, although not shown, the display panel 120 may include a lower polarizer (not shown), an upper polarizer (not shown), and a liquid crystal layer (not shown) disposed between the lower polarizer and the upper polarizer.

In this case, among light which is incident from the backlight unit 110 onto the display panel 120, only light parallel to a transmission axis of the lower polarizer (not shown) passes through the liquid crystal layer (not shown) via the lower polarizer (not shown). Furthermore, the light is linearly polarized in a direction (which is twisted by 90 degrees with respect to a transmission axis of the lower polarizer) by passing through the liquid crystal layer (not shown), and the linearly polarized light passes through a polarization layer of the upper polarizer.

The first polarization lens panel 140 transmits an image displayed by the display panel 120 as-is in the plane image display mode. In the stereoscopic image display mode, the first polarization lens panel 140 separates a left image and a right image, thereby providing a plane image or a stereoscopic image to a viewer.

The polarization lens control panel 130 is disposed between the display panel 120 and the first polarization lens panel 140, and controls a polarization direction of light which is incident from the display panel 120 onto the first polarization lens panel 140.

Hereinafter, the polarization lens control panel 130 and the first polarization lens panel 140 will be described in more detail with reference to FIGS. 2 to 4.

Figure 2:
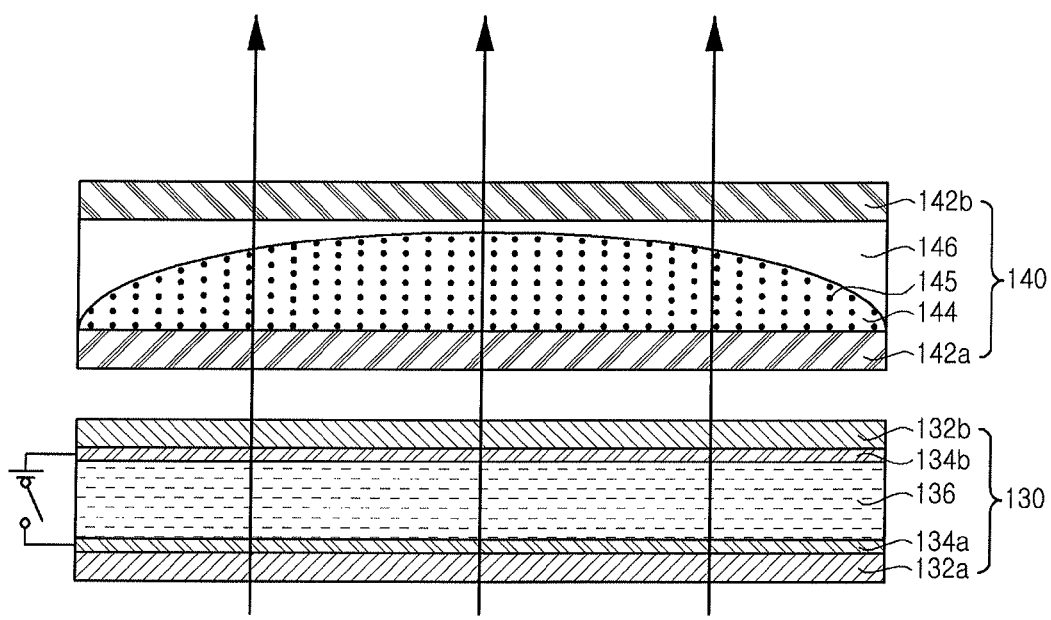
FIG. 2 is a diagram schematically illustrating a polarization lens control panel and a first polarization lens panel in the plane image display mode.

FIG. 2 is a diagram schematically illustrating the polarization lens control panel 130 and the first polarization lens panel 140 in the plane image display mode. FIG. 3 is a diagram schematically illustrating the polarization lens control panel 130 and the first polarization lens panel 140 in the stereoscopic image display mode.

Figure 3:
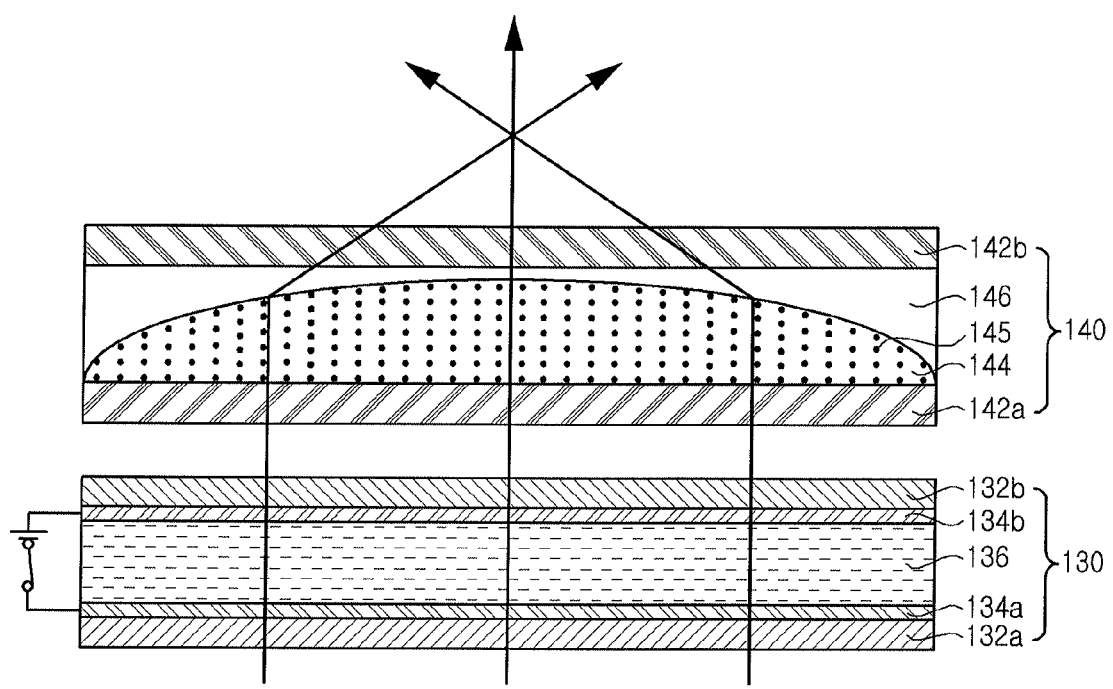
FIG. 3 is a diagram schematically illustrating the polarization lens control panel and the first polarization lens panel in the stereoscopic image display mode.

Referring to FIGS. 2 and 3, the first polarization lens panel 140 includes a first substrate 142a, a second substrate 142b, and a refractive layer 146 and a liquid crystal layer 144 which are formed between the first substrate 142a and the second substrate 142b.

The first and second substrates 142a and 142b may be formed of a film of a transparent material capable of transmitting light.

The refractive layer 146 is disposed under the second substrate 142b, and has a shape of an inverted semicylinder-shaped concave lens. The refractive layer 146 may be formed of an ultraviolet (UV)-hardening polymer material.

The liquid crystal layer 144 is formed between the first substrate 142a and the refractive layer 146, and has a shape of a convex lens due to a shape of the refractive layer 146. The liquid crystal layer 144 includes a liquid crystal 145, having an optical anisotropy, and a compound of reactive mesogen (RM).

The RM is a light-reactive compound, and is hardened on the first substrate 142a by reacting with light such as UV. In this case, the liquid crystal 145 contained in the compound is fixed in an initially aligned direction by hardening the RM.

The liquid crystal layer 144 has a long-axis refractive index ($n_e$) and a short-axis refractive index ($n_o$) of the liquid crystal 145 due to the optical anisotropy of the liquid crystal 145. The refractive layer 146 is formed identically to one of the long-axis refractive index ($n_e$) and short-axis refractive index ($n_o$) of the liquid crystal 145.

Therefore, light which vibrates in an axis direction of the refractive layer 146 is refracted at a boundary between the refractive layer 146 and the liquid crystal layer 144 because the refractive index of the refractive layer 146 is recognized as being different from the refractive index of the liquid crystal layer 144, but light which vibrates in a direction vertical to an axis of the refractive layer 146 is not refracted at a boundary between the refractive layer 146 and the liquid crystal layer 144 because the refractive index of the refractive layer 146 is recognized as being identical to the refractive index of the liquid crystal layer 144. By using such characteristics, the first polarization lens panel 140 may selectively display a plane image and a stereoscopic image to a viewer.

The polarization lens control panel 130 selects whether to display a plane image or whether to display a stereoscopic image. The polarization lens control panel 130 includes a third substrate 132a, a fourth substrate 132b, a lower electrode 134a, an upper electrode 134b, and a polymer liquid crystal layer 136 formed between the lower electrode 134a and the upper electrode 134b.

The third and fourth substrates 132a and 132b may be formed of a film of a transparent material capable of transmitting light.

The lower electrode 134a is disposed on the third substrate 132a, and is formed of a transparent conductive material (for example, indium tin oxide (ITO), indium zinc oxide (IZO), or the like) capable of transmitting light.

The upper electrode 134b is disposed under the fourth substrate 132b, and is formed of a transparent conductive material (for example, indium tin oxide (ITO), indium zinc oxide (IZO), or the like) capable of transmitting light.

The lower electrode 134a and the upper electrode 134b generate a vertical electric field when an external voltage is supplied thereto.

The polymer liquid crystal layer 136 is disposed between the lower electrode 134a and the upper electrode 134b, and is formed of a compound of a liquid crystal and a polymer. The polymer is a light-reactive compound, and when polarization UV is irradiated, the polymer determines an alignment direction of the liquid crystal, and fixes the liquid crystal.

Due to a characteristic of the polymer liquid crystal layer 136, the third and fourth substrates 132a and 132b of the polarization lens control panel 130 according to an embodiment of the present invention may be formed as a film type.

When a nematic liquid crystal is used, due to a liquidity of the nematic liquid crystal, it is difficult to manufacture the third and fourth substrates 132a and 132b of the polarization lens control panel 130 as a film, and thus, a glass substrate is used. For this reason, the polarization lens control panel 130 is thick in thickness, and is weighty in weight.

On the other hand, when a polymer liquid crystal is used, due to the above-described reason, it is possible to manufacture the third and fourth substrates 132a and 132b of the polarization lens control panel 130 as a film, and thus, the polarization lens control panel 130 is thin in thickness, and is light in weight.

A liquid crystal alignment state of the polymer liquid crystal layer 136 can realize the twisted nematic (TN) mode, the in-plane switching (IPS) mode, and the vertical alignment (VA) mode.

The polymer liquid crystal layer 136 controls an alignment direction of a liquid crystal 137 according to whether a voltage is applied thereto, thereby adjusting a polarization direction of light incident from the display panel 120.

In an embodiment, the polymer liquid crystal layer 136 may adjust a polymer content ratio so that transparency is maintained irrespective of whether a voltage is applied. The stereoscopic image display device 100 should enable a viewer to view a clear plane image or stereoscopic image displayed by the display panel 120. To this end, the polymer liquid crystal layer 136 should be always transparent irrespective of whether a voltage is applied.

Figure 4:
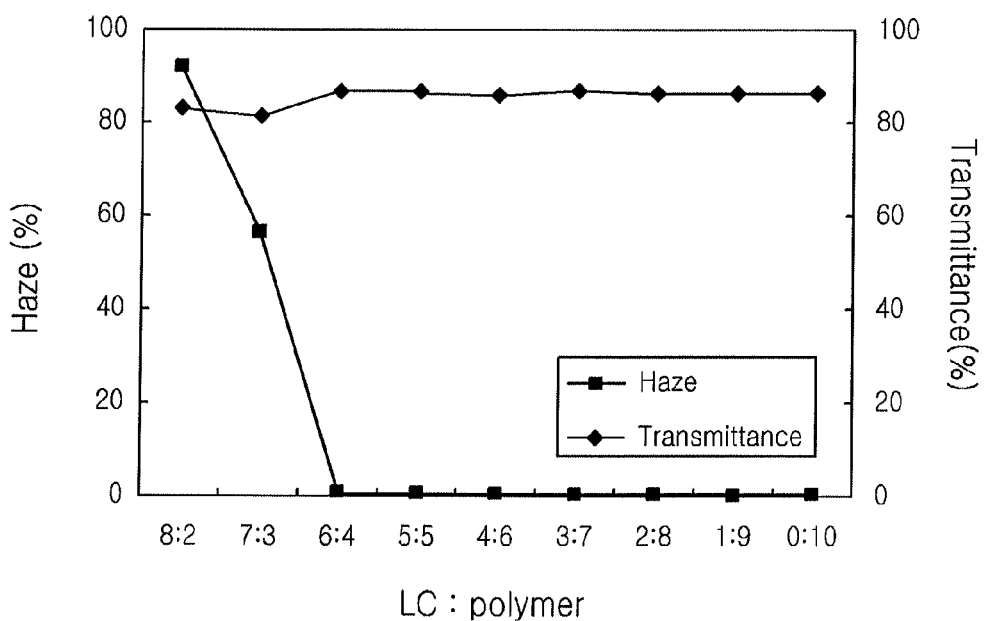
FIG. 4 is a diagram showing a haze and a transmittance with respect to a combination ratio of a polymer and a liquid crystal.

To provide a description on an example, when a haze and a transmittance with respect to a combination ratio of a polymer and a liquid crystal are as shown in FIG. 4, the polymer liquid crystal layer 136 may have a polymer content ratio of 40% or more. If the polymer content ratio is 40% or more, the polymer liquid crystal layer 136 is transparent because having a haze of 0%. However, if the polymer content ratio is lower than 40%, the polymer liquid crystal layer 136 is unclear because a haze increases, causing degradation in a quality of a plane image or a stereoscopic image provided to a viewer.

The combination ratio of the polymer and liquid crystal included in the polymer liquid crystal layer 136 may be changed according to a kind and physical properties of the polymer or liquid crystal.

The following description will be made on an example in which a plane image or a stereoscopic image is realized according to whether a voltage is applied.

It is assumed that the liquid crystal layer 144 included in the first polarization lens panel 140 may have a long-axis refractive index ($n_e$) and a short-axis refractive index ($n_o$) of the liquid crystal 145 due to the optical anisotropy of the liquid crystal 145, and the refractive layer 146 may be formed identically to the short-axis refractive index ($n_o$) of the liquid crystal 145 included in the liquid crystal layer 144.

As illustrated in FIG. 2, when a voltage is not applied to the lower electrode 134a and the upper electrode 134b, a polarization state of light incident from the display panel 120 is changed by 90 degrees by the polarization lens control panel 130.

In this case, light incident onto the first polarization lens panel 140 has the same direction as a short-axis direction of the liquid crystal 145 included in the liquid crystal layer 144, and undergoes the short-axis refractive index ($n_o$) of the liquid crystal 145.

The short-axis refractive index ($n_o$) of the liquid crystal 145 is the substantially same as a refractive index (n) of the refractive layer 146, and thus, light travels without being refracted because the liquid crystal layer 144 and the refractive layer 146 are recognized as the same medium by the light, thereby realizing a plane image.

On the other hand, as illustrated in FIG. 3, when a voltage is applied to the lower electrode 134a and the upper electrode 134b, light incident from the display panel 120 is incident onto the first polarization lens panel 140 without a polarization state of the light being changed.

In this case, the light incident onto the first polarization lens panel 140 has the same direction as a long-axis direction of the liquid crystal 145 included in the liquid crystal layer 144, and undergoes the long-axis refractive index ($n_e$) of the liquid crystal 145.

Since long-axis refractive index ($n_e$) of the liquid crystal 145 is greater than the refractive index (n) of the refractive layer 146, light is refracted. Therefore, the liquid crystal layer 144 having a convex lens shape acts as a convex lens, and separates a left image and a right image displayed by the display panel 120 to provide the separated left and right images to a viewer, thereby realizing a stereoscopic image.

Figure 5:
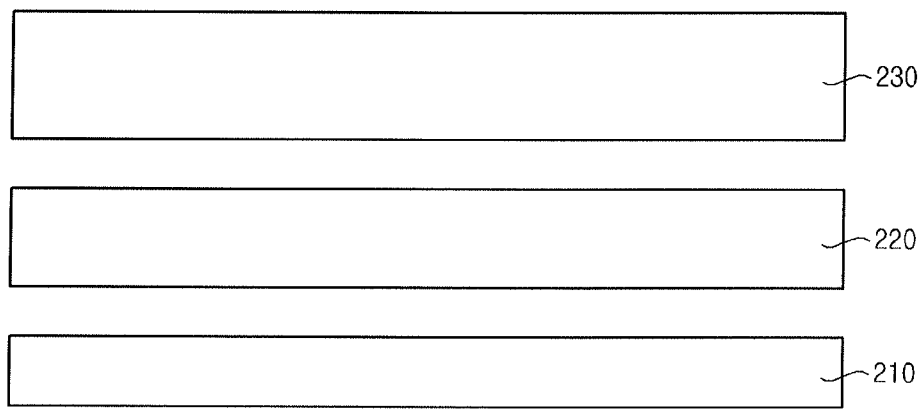
FIG. 5 is a diagram schematically illustrating a stereoscopic image display device according to another embodiment of the present invention.

FIG. 5 is a diagram schematically illustrating a stereoscopic image display device 200 according to another embodiment of the present invention.

Referring to FIG. 5, the stereoscopic image display device 200 according to another embodiment of the present invention includes a display panel 220, a backlight unit 210 that is disposed under the display panel 220 to supply light to the display panel 220, and a second polarization lens panel 230. Here, if the display panel 220 is an element that self-emits light, the backlight unit 210 may not be provided.

The backlight unit 210 and the display panel 220 have the same configuration according to the first embodiment, and thus, their detailed descriptions are not provided.

The second polarization lens panel 230 controls a polarization direction of light incident from the display panel 220 to transmit an image displayed by the display panel 220 as-is in the plane image display mode and to separate a left image and a right image in the stereoscopic image display mode. Therefore, the second polarization lens panel 230 selectively provides a plane image and a stereoscopic image to a viewer.

The second polarization lens panel 230 realizes a plane image or a stereoscopic image according to whether a voltage is applied thereto. As an example, when a voltage is applied, the second polarization lens panel 230 realizes a stereoscopic image, and when a voltage is not applied, the second polarization lens panel 230 realizes a plane image. Also, the second polarization lens panel 230 may be driven on the contrary to the above-described operation.

Hereinafter, the second polarization lens panel 230 will be described in detail with reference to FIGS. 6 and 7.

Figure 6:
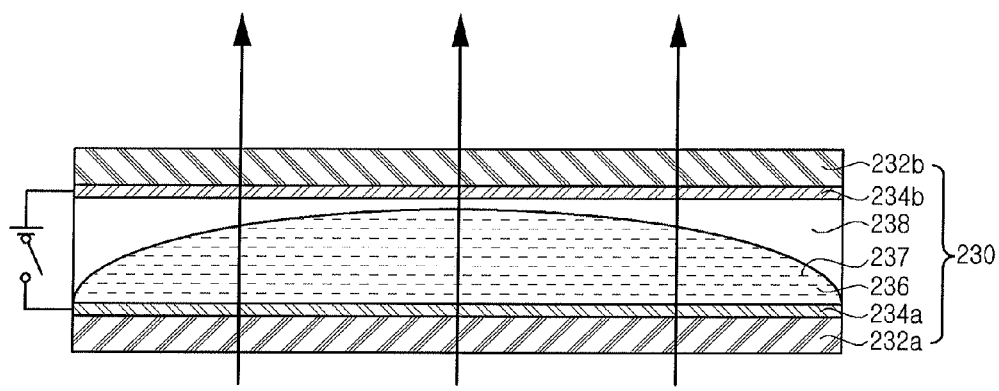
FIG. 6 is a diagram schematically illustrating a second polarization lens panel in the plane image display mode.

FIG. 6 is a diagram schematically illustrating the second polarization lens panel in the plane image display mode. FIG. 7 is a diagram schematically illustrating the second polarization lens panel in the stereoscopic image display mode.

Figure 7:
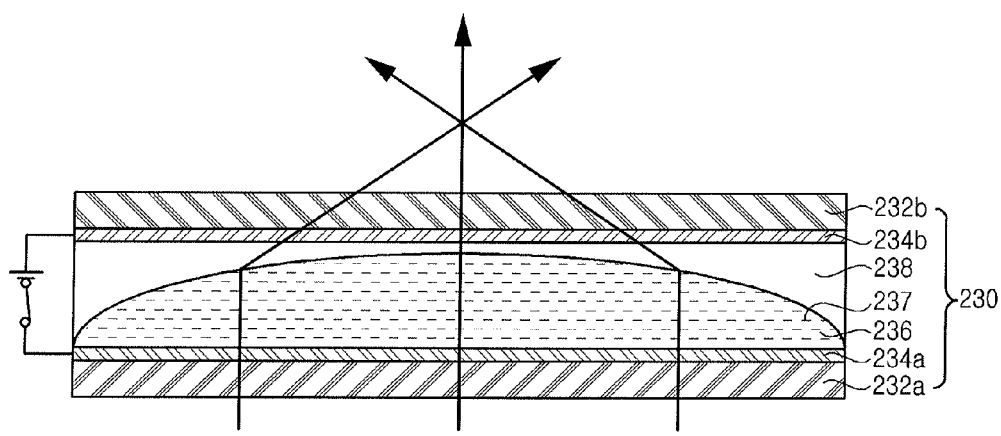
FIG. 7 is a diagram schematically illustrating the second polarization lens panel in the stereoscopic image display mode.

Referring to FIGS. 6 and 7, the second polarization lens panel 230 includes a first substrate 232a, a second substrate 232b, an upper electrode 234b, a lower electrode 234a, and a refractive layer 238 and a polymer liquid crystal layer 236 which are formed between the upper electrode 234b and the lower electrode 234a.

The first and second substrates 232a and 232b may be formed of a film of a transparent material capable of transmitting light.

The lower electrode 234a is disposed on the first substrate 232a, and is formed of a transparent conductive material (for example, indium tin oxide (ITO), indium zinc oxide (IZO), or the like) capable of transmitting light.

The upper electrode 234b is disposed under the second substrate 232b, and is formed of a transparent conductive material (for example, indium tin oxide (ITO), indium zinc oxide (IZO), or the like) capable of transmitting light.

The lower electrode 234a and the upper electrode 234b generate a vertical electric field when an external voltage is supplied thereto.

The refractive layer 238 is disposed under the second substrate 232b, and has a shape of an inverted semicylinder-shaped concave lens. The refractive layer 238 may be formed of an ultraviolet (UV)-hardening polymer material.

The polymer liquid crystal layer 236 is formed between the first substrate 232a and the refractive layer 238, and has a shape of a convex lens due to a shape of the refractive layer 238. The polymer liquid crystal layer 236 is formed of a compound of a liquid crystal and a polymer. The polymer is a light-reactive compound, and when polarization UV is irradiated, the polymer determines an alignment direction of a liquid crystal 237, and fixes the liquid crystal 237.

A liquid crystal alignment state of the polymer liquid crystal layer 236 can realize the twisted nematic (TN) mode, the in-plane switching (IPS) mode, and the vertical alignment (VA) mode.

In an embodiment, the polymer liquid crystal layer 236 may adjust a polymer content ratio so that transparency is maintained irrespective of whether a voltage is applied. The stereoscopic image display device 200 should enable a viewer to view a clear plane image or stereoscopic image displayed by the display panel 220. To this end, the polymer liquid crystal layer 236 should be always transparent irrespective of whether a voltage is applied.

The combination ratio of the polymer and liquid crystal included in the polymer liquid crystal layer 236 may be changed according to a kind and physical properties of the polymer or liquid crystal.

The polymer liquid crystal layer 236 has a long-axis refractive index ($n_e$) and a short-axis refractive index ($n_o$) of the liquid crystal 237 due to the optical anisotropy of the liquid crystal 237. The refractive layer 238 is formed identically to one of the long-axis refractive index ($n_e$) and short-axis refractive index ($n_o$) of the liquid crystal 237.

Therefore, light which vibrates in an axis direction of the refractive layer 238 is refracted at a boundary between the refractive layer 238 and the polymer liquid crystal layer 236 because the refractive index of the refractive layer 238 is recognized as being different from the refractive index of the polymer liquid crystal layer 236, but light which vibrates in a direction vertical to an axis of the refractive layer 238 is not refracted at a boundary between the refractive layer 238 and the polymer liquid crystal layer 236 because the refractive index of the refractive layer 238 is recognized as being identical to the refractive index of the polymer liquid crystal layer 236. By using such characteristics, the second polarization lens panel 230 may selectively display a plane image and a stereoscopic image to a viewer.

The polymer liquid crystal layer 236 controls an alignment direction of the liquid crystal 237 according to whether a vertical electric field is generated between the lower electrode 234a and the upper electrode 234b, thereby adjusting a polarization direction of light incident from the display panel 236.

The following description will be made on an example in which a plane image or a stereoscopic image is realized according to whether a voltage is applied.

It is assumed that the polymer liquid crystal layer 236 included in the second polarization lens panel 230 may have a long-axis refractive index ($n_e$) and a short-axis refractive index ($n_o$) of the liquid crystal 237 due to the optical anisotropy of the liquid crystal 237, and the refractive layer 238 may be formed identically to the short-axis refractive index ($n_o$) of the liquid crystal 237. Furthermore, it is assumed that a rubbing direction of the polymer liquid crystal layer 236 matches a transmission axis of an upper polarizer of the display panel 220.

As illustrated in FIG. 6, when a voltage is not applied to the lower electrode 234a and the upper electrode 234b, a short-axis of the liquid crystal 237 included in the polymer liquid crystal layer 236 is aligned in the same direction as a polarization direction of light incident from the display panel 220. Therefore, light incident onto the second polarization lens panel 230 undergoes the short-axis refractive index ($n_o$) of the liquid crystal 237.

The short-axis refractive index ($n_o$) of the liquid crystal 237 is the substantially same as a refractive index (n) of the refractive layer 238, and thus, light travels without being refracted because the polymer liquid crystal layer 236 and the refractive layer 238 are recognized as the same medium by the light, thereby realizing a plane image.

On the other hand, when a voltage is applied to the lower electrode 234a and the upper electrode 234b, the liquid crystal 237 included in the polymer liquid crystal layer 236 is driven according to an electric field direction. Therefore, light incident onto the second polarization lens panel 230 undergoes the long-axis refractive index ($n_e$) of the liquid crystal 237.

Since long-axis refractive index ($n_e$) of the liquid crystal 237 is greater than the refractive index (n) of the refractive layer 238, light is refracted. Therefore, the polymer liquid crystal layer 236 having a convex lens shape acts as a convex lens, and separates a left image and a right image displayed by the display panel 220 to provide the separated left and right images to a viewer, thereby realizing a stereoscopic image.

Although not shown in FIGS. 6 and 7, the second polarization lens panel 230 may further include an alignment layer (not shown) that is formed along an outer portion of the polymer liquid crystal layer 236. The alignment layer (not shown) aligns molecules of the liquid crystal 237 included in the polymer liquid crystal layer 236 in a certain direction.

For example, a thin film may be formed of polyimide and hardened, and fine grooves may be formed by performing a rubbing process on a surface of the hardened thin film, thereby finishing the alignment layer (not shown).

The alignment layer (not shown) may include a first alignment layer (not shown) formed on the lower electrode 234a and a second alignment layer (not shown) formed between the polymer liquid crystal layer 236 and the refractive layer 238.

In FIGS. 6 and 7, the polymer liquid crystal layer 236 is illustrated as having a convex lens shape, but is not limited thereto. According to another embodiment, the polymer liquid crystal layer 236 may have a Fresnel lens.

In comparison with the stereoscopic image display device 100 according to an embodiment, since the stereoscopic image display device 200 according to another embodiment does not need the polarization lens control panel 130, the stereoscopic image display device 200 is slimmed in thickness, the manufacturing cost is reduced, and a manufacturing process is simplified.

Figure 8:
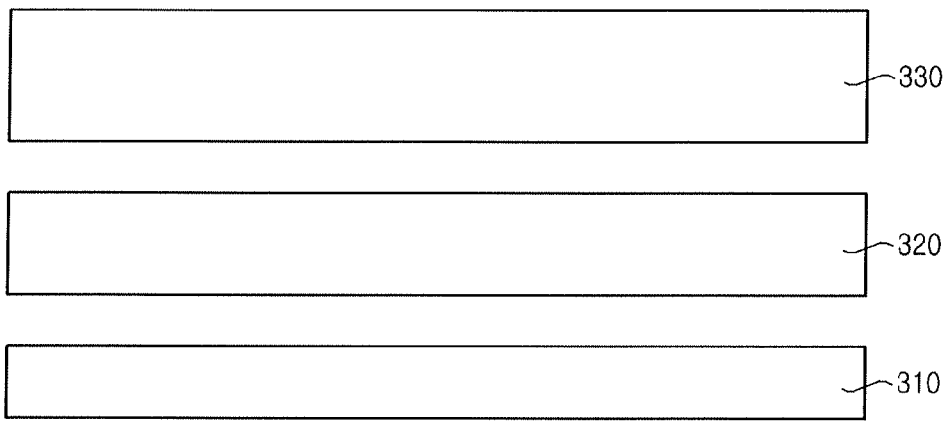
FIG. 8 is a diagram schematically illustrating a stereoscopic image display device according to another embodiment of the present invention.

FIG. 8 is a diagram schematically illustrating a stereoscopic image display device 300 according to another embodiment of the present invention.

Referring to FIG. 8, the stereoscopic image display device 300 according to another embodiment of the present invention includes a display panel 320, a backlight unit 310 that is disposed under the display panel 320 to supply light to the display panel 320, and a polarization lens integration panel 330. Here, if the display panel 320 is an element that self-emits light, the backlight unit 310 may not be provided.

The backlight unit 310 and the display panel 320 have the same configuration according to the first embodiment, and thus, their detailed descriptions are not provided.

The polarization lens integration panel 330 controls a polarization direction of light incident from the display panel 320 to transmit an image displayed by the display panel 320 as-is in the plane image display mode and to separate a left image and a right image in the stereoscopic image display mode. Therefore, the polarization lens integration panel 330 selectively provides a plane image and a stereoscopic image to a viewer.

The polarization lens integration panel 330 realizes a plane image or a stereoscopic image according to whether a voltage is applied thereto. As an example, when a voltage is applied, the polarization lens integration panel 330 realizes a stereoscopic image, and when a voltage is not applied, the polarization lens integration panel 330 realizes a plane image. Also, the polarization lens integration panel 330 may be driven on the contrary to the above-described operation.

Hereinafter, the polarization lens integration panel 330 will be described in detail with reference to FIGS. 9 to 10.

Figure 9:
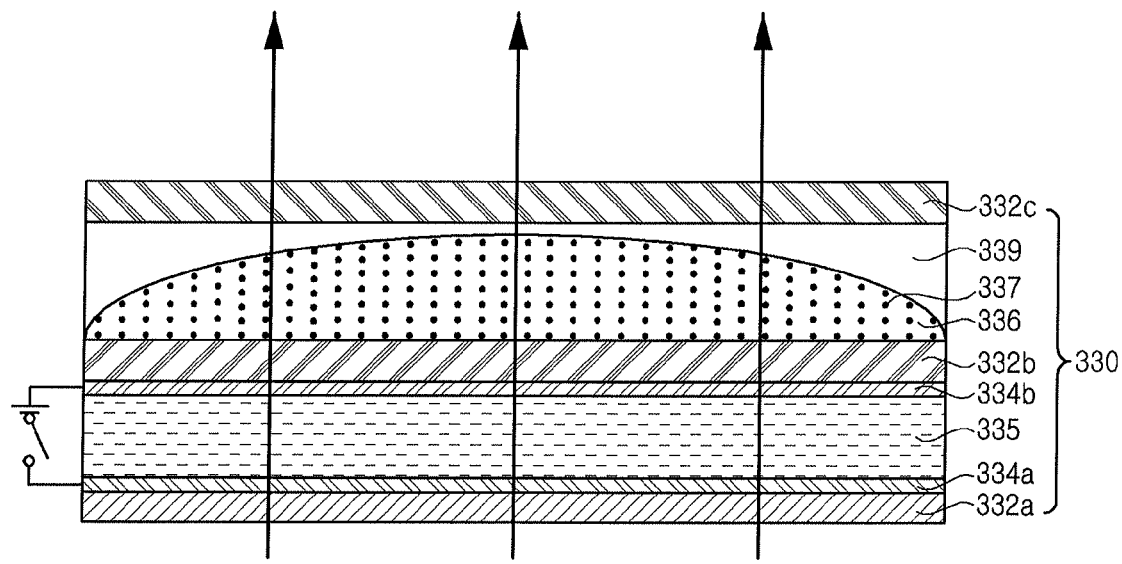
FIG. 9 is a diagram schematically illustrating a polarization lens integration panel in the plane image display mode.

FIG. 9 is a diagram schematically illustrating the polarization lens integration panel in the plane image display mode. FIG. 10 is a diagram schematically illustrating the polarization lens integration panel in the stereoscopic image display mode.

Figure 10:
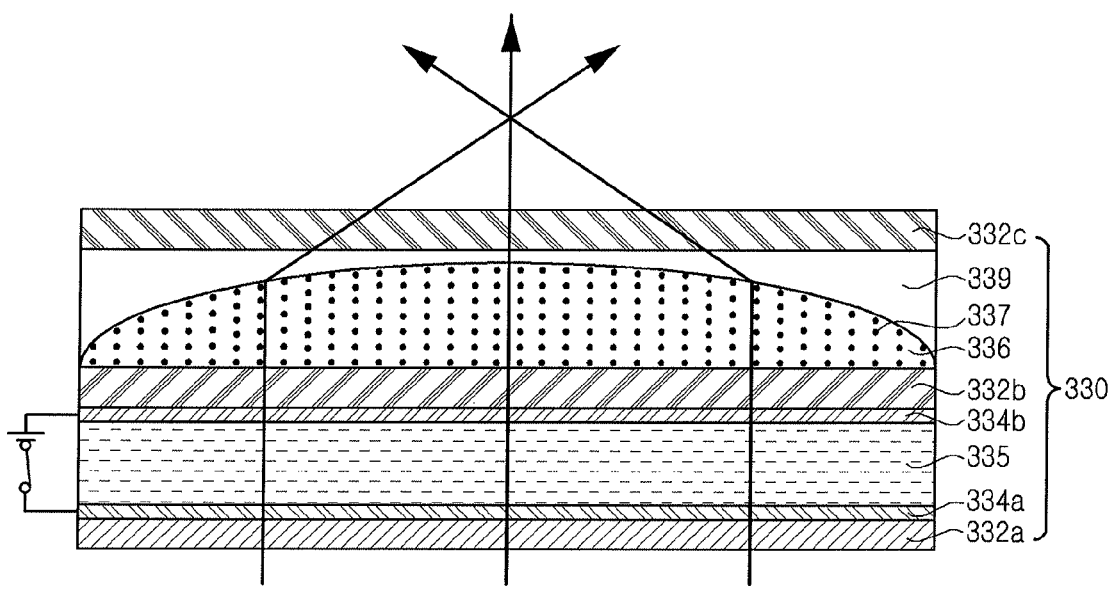
FIG. 10 is a diagram schematically illustrating the polarization lens integration panel in the stereoscopic image display mode.

Referring to FIGS. 9 and 10, by using the polarization lens integration panel 330, one cell performs a function of the polarization lens panel and a function of the polarization lens control panel.

In detail, the polarization lens integration panel 330 includes a first substrate 332a, a second substrate 332b, a lower electrode 334a, an upper electrode 334b, and a polymer liquid crystal layer 335 formed between the lower electrode 334a and the upper electrode 334b. Therefore, the polarization lens integration panel 330 performs the function of the polarization lens control panel.

Moreover, the polarization lens integration panel 330 includes a third substrate 332c, a liquid crystal layer 336, and a refractive layer 339. Therefore, the polarization lens integration panel 330 performs the function of the polarization lens panel.

The first and second substrates 332a and 332b may be formed of a film of a transparent material capable of transmitting light.

The lower electrode 334a is disposed on the first substrate 332a, and is formed of a transparent conductive material (for example, indium tin oxide (ITO), indium zinc oxide (IZO), or the like) capable of transmitting light.

The upper electrode 334b is disposed under the second substrate 332b, and is formed of a transparent conductive material (for example, indium tin oxide (ITO), indium zinc oxide (IZO), or the like) capable of transmitting light.

The lower electrode 334a and the upper electrode 334b generate a vertical electric field when an external voltage is supplied thereto.

The polymer liquid crystal layer 335 is disposed between the lower electrode 334a and the upper electrode 334b, and is formed of a compound of a liquid crystal and a polymer. The polymer is a light-reactive compound, and when polarization UV is irradiated, the polymer determines an alignment direction of a liquid crystal, and fixes the liquid crystal.

Due to a characteristic of the polymer liquid crystal layer 335, the first and second substrates 332a and 332b of the polarization lens integration panel 330 according to another embodiment of the present invention may be formed as a film type. Accordingly, the polarization lens integration panel 330 is thin in thickness, and is light in weight.

A liquid crystal alignment state of the polymer liquid crystal layer 335 can realize the twisted nematic (TN) mode, the in-plane switching (IPS) mode, and the vertical alignment (VA) mode.

The polymer liquid crystal layer 335 controls an alignment direction of the liquid crystal according to whether a voltage is applied thereto, thereby adjusting a polarization direction of light incident from the display panel 320.

In an embodiment, the polymer liquid crystal layer 335 may adjust a polymer content ratio so that transparency is maintained irrespective of whether a voltage is applied. The stereoscopic image display device 300 should enable a viewer to view a clear plane image or stereoscopic image displayed by the display panel 320. To this end, the polymer liquid crystal layer 335 should be always transparent irrespective of whether a voltage is applied.

The combination ratio of the polymer and liquid crystal included in the polymer liquid crystal layer 335 may be changed according to a kind and physical properties of the polymer or liquid crystal.

The third substrate 332c may be formed of a film of a transparent material capable of transmitting light.

The refractive layer 339 is disposed under the third substrate 332c, and has a shape of an inverted semicylinder-shaped concave lens. The refractive layer 339 may be formed of a UV-hardening polymer material.

The liquid crystal layer 336 is formed between the second substrate 332b and the refractive layer 339, and has a shape of a convex lens due to a shape of the refractive layer 339. The liquid crystal layer 336 includes a liquid crystal 337, having an optical anisotropy, and a compound of reactive mesogen (RM).

The RM is a light-reactive compound, and is hardened on the second substrate 332b by reacting with light such as UV. In this case, the liquid crystal 337 contained in the compound is fixed in an initially aligned direction by hardening the RM.

The liquid crystal layer 336 has a long-axis refractive index ($n_e$) and a short-axis refractive index ($n_o$) of the liquid crystal 337 due to the optical anisotropy of the liquid crystal 337. The refractive layer 339 is formed identically to one of the long-axis refractive index ($n_e$) and short-axis refractive index ($n_o$) of the liquid crystal 337.

Therefore, light which vibrates in an axis direction of the refractive layer 339 is refracted at a boundary between the refractive layer 339 and the liquid crystal layer 336 because the refractive index of the refractive layer 339 is recognized as being different from the refractive index of the liquid crystal layer 336, but light which vibrates in a direction vertical to an axis of the refractive layer 339 is not refracted at a boundary between the refractive layer 339 and the liquid crystal layer 336 because the refractive index of the refractive layer 339 is recognized as being identical to the refractive index of the liquid crystal layer 336. By using such characteristics, the polarization lens integration panel 330 may selectively display a plane image and a stereoscopic image to a viewer.

The following description will be made on an example in which a plane image or a stereoscopic image is realized according to whether a voltage is applied.

It is assumed that the liquid crystal layer 336 included in the polarization lens integration panel 330 may have a long-axis refractive index ($n_e$) and a short-axis refractive index ($n_o$) of the liquid crystal 337 due to the optical anisotropy of the liquid crystal 337, and the refractive layer 339 may be formed identically to the short-axis refractive index ($n_o$) of the liquid crystal 337 included in the liquid crystal layer 336.

As illustrated in FIG. 9, when a voltage is not applied to the lower electrode 334a and the upper electrode 334b, a polarization state of light incident from the display panel 320 is changed by 90 degrees by the polymer liquid crystal layer 335.

In this case, light incident onto the liquid crystal layer 336 has the same direction as a short-axis direction of the liquid crystal 337, and undergoes the short-axis refractive index ($n_o$) of the liquid crystal 337.

The short-axis refractive index ($n_o$) of the liquid crystal 337 is the substantially same as a refractive index (n) of the refractive layer 339, and thus, light travels without being refracted because the liquid crystal layer 337 and the refractive layer 339 are recognized as the same medium by the light, thereby realizing a plane image.

On the other hand, as illustrated in FIG. 10, when a voltage is applied to the lower electrode 334a and the upper electrode 334b, light incident from the display panel 320 is incident onto the liquid crystal layer 336 without a polarization state of the light being changed.

In this case, the light incident onto the liquid crystal layer 336 has the same direction as a long-axis direction of the liquid crystal 337, and undergoes the long-axis refractive index ($n_e$) of the liquid crystal 337.

Since long-axis refractive index ($n_e$) of the liquid crystal 337 is greater than the refractive index (n) of the refractive layer 339, light is refracted. Therefore, the liquid crystal layer 336 having a convex lens shape acts as a convex lens, and separates a left image and a right image displayed by the display panel 320 to provide the separated left and right images to a viewer, thereby realizing a stereoscopic image.

Although not shown, the polarization lens integration panel 330 may further include an alignment layer (not shown), and may align the liquid crystal molecules included in the polymer liquid crystal layer 335 in a certain direction.

For example, a thin film may be formed of polyimide and hardened, and fine grooves may be formed by performing a rubbing process on a surface of the hardened thin film, thereby finishing the alignment layer (not shown).

The alignment layer (not shown) may include a first alignment layer (not shown) formed on the lower electrode 334a and a second alignment layer (not shown) formed under the upper electrode 334b.

Moreover, the polarization lens integration panel 330 may further include the alignment layer (not shown) that is formed along an outer portion of the liquid crystal layer 336, and may align molecules of the liquid crystal 337 included in the liquid crystal layer 336 in a certain direction.

The alignment layer (not shown) may include a third alignment layer (not shown) formed on the second substrate 332b and a fourth alignment layer (not shown) formed between the liquid crystal layer 336 and the refractive layer 339.

In the drawing, the liquid crystal layer 336 is illustrated as having a convex lens shape, but is not limited thereto. According to another embodiment, the liquid crystal layer 336 may have the Fresnel lens. According to another embodiment, the liquid crystal layer 336 may have a convex lens shape.

In comparison with the stereoscopic image display device 100 according to an embodiment, in the stereoscopic image display device 300 according to another embodiment, the polarization lens panel 140 and the polarization lens control panel 130 are implemented as one polarization lens integration panel 330.

The polarization lens panel 140 is not simply stacked on the polarization lens control panel 130, and by removing one substrate, the polarization lens integration panel 330 is implemented. Accordingly, the stereoscopic image display device 300 is slimmed in thickness, the manufacturing cost is reduced, and a manufacturing process is simplified.

In comparison with the existing polymer dispersed liquid crystal (PDLC), the polymer liquid crystal layer according to the present invention has differences listed in the following Table 1.

TABLE 1

| | PDLC | Polymer Liquid Crystal Layer |
|---|---|---|
| Presence of Liquid Crystal Alignment | X | O |
| Phase Separation | PIPS | PIPS (polymer network formation) |
| Voltage On | Transmittance | Transmittance (polarization modulation O)-2D mode |
| Voltage Off | Dispersion (Opaque) | Transmittance (polarization modulation X)-3D mode |
| Electrode Configuration | Only vertical electric field possible | Vertical and horizontal electric fields possible |

According to the present invention, the thickness of the stereoscopic image display device can be reduced by using the film instead of the glass substrate.

Moreover, according to the present invention, since the polarization lens control panel is not required, the manufacturing process can be simplified, thus enhancing the manufacturing efficiency of the stereoscopic image display device.

Moreover, according to the present invention, the number of elements can decrease, thus reducing the manufacturing cost.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display device comprising:
a display panel configured to display an image; and
a polarization lens panel disposed on the display panel, and configured to transmit light supplied from the display panel according to an image display mode, wherein the polarization lens panel comprises:
first and second substrates;
a lower electrode formed on the first substrate;
an upper electrode formed on the second substrate; and
a polymer liquid crystal layer of a polymer liquid crystal in which a polymer and a liquid crystal are combined, disposed between the lower electrode and the upper electrode.

2. The stereoscopic image display device of claim 1, wherein the polymer liquid crystal layer has a convex lens shape or a Fresnel lens shape.

3. The stereoscopic image display device of one of claim 1, wherein an alignment direction of the liquid crystal of the polymer liquid crystal layer is changed according to whether a voltage is applied.

4. The stereoscopic image display device of claim 3, wherein,
when the voltage is not applied, a short-axis of the liquid crystal is aligned in the same direction as a polarization direction of the light incident from the display panel, and
when the voltage is applied, a long-axis of the liquid crystal is aligned in the same direction as a polarization direction of the light incident from the display panel.

5. The stereoscopic image display device of one of claim 1, wherein an alignment state of the liquid crystal of the polymer liquid crystal layer is one of a twisted nematic (TN) mode, an in-plane switching (IPS) mode, and a vertical alignment (VA) mode.

6. The stereoscopic image display device of one of claim 1, wherein molecules of the liquid crystal are aligned in a certain direction by irradiating polarization ultraviolet (UV) onto the liquid crystal, thereby forming the polymer liquid crystal layer.

7. The stereoscopic image display device of one of claim 1, wherein a rubbing direction of the polymer liquid crystal layer is the same as a polarization direction of the light incident from the display panel.

8. The stereoscopic image display device of claim 1, wherein the polymerization lens panel further comprises a refractive layer disposed on the polymer liquid crystal layer, and configured to have the same refractive index as a short-axis refractive index of the liquid crystal comprised in the polymer liquid crystal layer.

9. The stereoscopic image display device of one of claim 1, wherein each of the first and second substrates is formed of a film of a transparent material capable of transmitting the light.

10. A stereoscopic image display device comprising:
a display panel configured to display an image;
a polarization lens panel disposed on the display panel, and configured to transmit light supplied from the display panel according to an image display mode; and
a polarization lens control panel disposed between the display panel and the polarization lens panel, and configured to control a polarization state of the light incident from the display panel,
wherein the polarization lens control panel comprises:
first and second substrates;
a lower electrode formed on the first substrate;
an upper electrode formed on the second substrate; and
a polymer liquid crystal layer formed of a polymer liquid crystal in which a polymer and a liquid crystal are combined, and disposed between the lower electrode and the upper electrode.

11. A stereoscopic image display device comprising:
a display panel configured to display an image; and
a polarization lens integration panel disposed on the display panel, and configured to transmit light incident from the display panel according to an image display mode,
wherein the polarization lens integration panel comprises:
first to third substrates;
a lower electrode on the first substrate;
an upper electrode on the second substrate;
a polymer liquid crystal layer of a polymer liquid crystal in which a polymer and a liquid crystal are combined, disposed between the lower electrode and the upper electrode; and
a liquid crystal layer formed of a material having an optical anisotropy, and disposed between the second and third substrates.

12. The stereoscopic image display device of claim 11, wherein the liquid crystal layer has one of a concave lens shape, a convex lens shape or a Fresnel lens shape.

13. The stereoscopic image display device of claim 11, wherein the liquid crystal layer comprises a compound of the liquid crystal and reactive mesogen (RM).

* * * * *